Patented Feb. 25, 1941

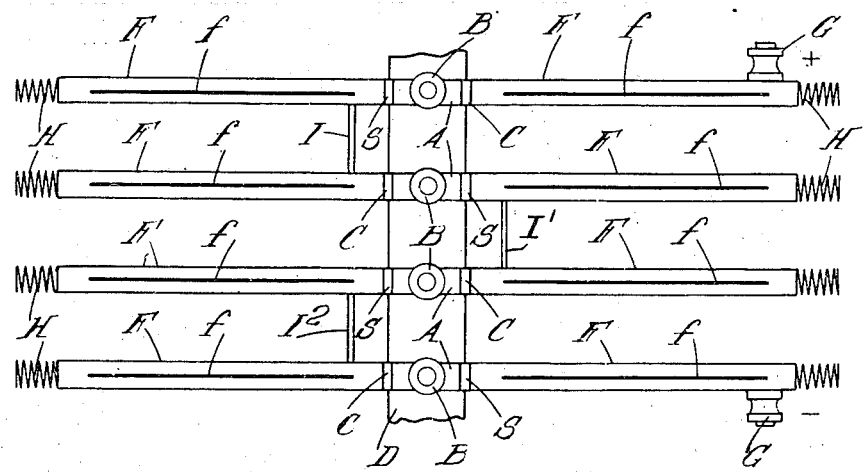
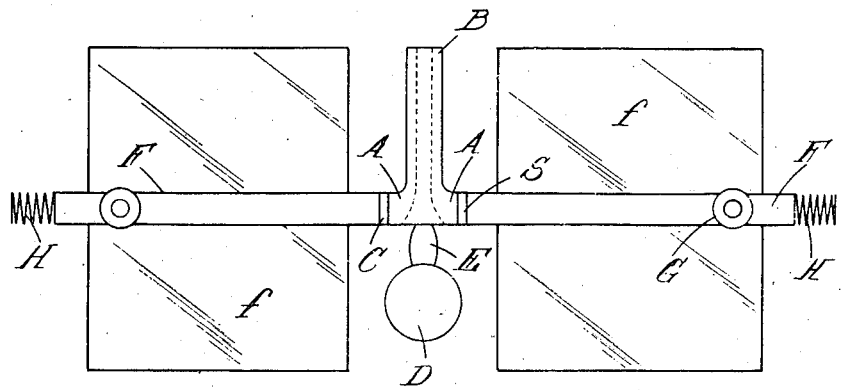

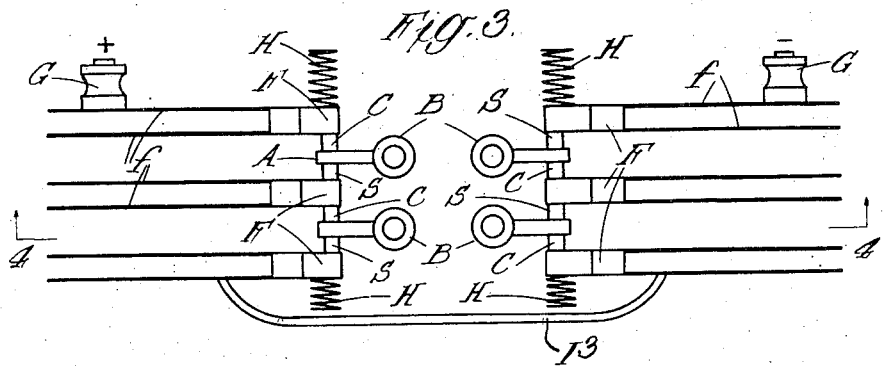
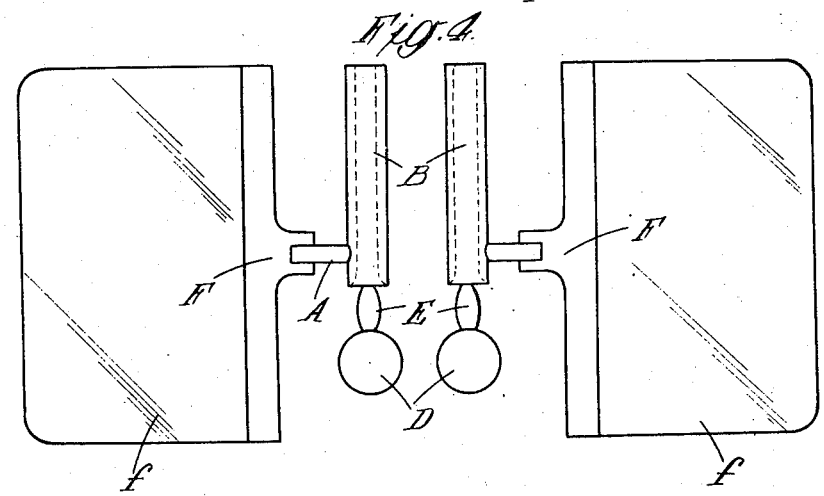
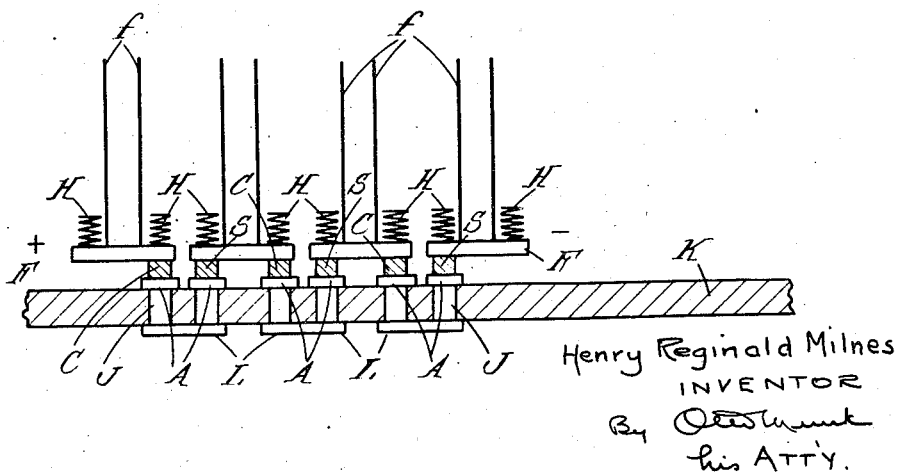

2,232,961

UNITED STATES PATENT OFFICE 2,232,961

APPARATUS FOR THERMAL GENERATION OF ELECTRIC CURRENT

Henry Reginald Milnes, Bingley, England

Application September 14, 1937, Serial No. 163,810
In Great Britain August 24, 1937

6 Claims. (Cl. 136—4)

This invention relates to improvements in thermo-electric generators.

In my co-pending application Serial No. 163,809, I have described thermo-electric couples and elements consisting of copper-silver and silver-copper alloys saturated with selenium and also a method for producing such selenium-saturated alloys.

The chief object of the present invention is to provide novel apparatus for the thermal generation of electric current by means of suitable thermoelectric generator elements and thermocouples, preferably of the kind described in my co-pending application or of a similar type.

According to one feature of the present invention, a positive element and a negative element are heated on opposite sides whilst their other sides are cooled, and their combined currents taken off through conductors of low resistance.

The current generating elements are preferably thin—having a thickness of about $1/64$ of an inch to about $1/8$ of an inch. The heat may be conveniently applied to the one side and the other side may be cooled, by metallic conductors which should be free from danger of oxidation to make good electrical contact. The heat may be applied to one side of each element by any metal which will be resistant to a flame and resistant to the atmosphere, while the other side may be cooled by a fin which may be any metal connected to a good conductor such as copper or silver—but instead of cooling fins, a system of water cooling may be used.

When working at a temperature approaching the melting point of selenium, it is desirable to provide some means for preventing the selenium from being absorbed into the metallic conductors with which the elements contact. To this end, the elements or the contact points of the conductors may be plated or covered with rhodium, platinum, or iridium. This plating may also be used to protect the metal of the conductors from oxidation when working at higher temperatures.

When two elements of different heat-conducting properties, such as a copper alloy element and a silver alloy element, are to be used together, it is desirable to provide some means for absorbing some of the heat before it reaches the silver alloy. This is necessary because the melting point of the silver alloy is much lower than that of the copper alloy, consequently, if the same source of heat were used for heating both elements, the heat necessary for efficient operation of the copper alloy element would cause serious deterioration of the silver element. To this end, a material having a low heat conductivity is placed between the heated surface of the silver element and the source of heat. As examples of suitable material for this purpose, there may be mentioned nickel, cobalt, iron or lead oxide saturated with selenium. These materials attach themselves firmly to the silver alloy when strongly heated, and are bad conductors of heat but sufficiently good conductors of electricity. Furthermore, these materials give substantially no thermo-electric effect.

According to a further feature of the invention, the current generated may be increased or multiplied by combining two or more pairs of positive and negative elements and grouping them together in series by means of suitable conductors.

In order that the invention may be clearly understood and readily carried into effect, certain practical embodiments thereof are hereinafter more fully described with reference to the accompanying diagrammatic drawings which are given by way of example only and not of limitation.

In these drawings:

Figure 1 is a plan view of one form of generator, and

Figure 2 is an end elevation thereof,

Figure 3 is a plan view of another form of generator, and

Figure 4 is an elevation of Figure 3 on the line 4—4

Figure 5 is a plan view of yet another form of generator which is connected to the side of a boiler seen in section.

Referring now to the drawings, in which like parts bear like reference letters, an element C comprising a copper-silver alloy, in which copper predominates, impregnated with selenium—and an element S—comprising a silver-copper alloy, in which silver predominates, impregnated with selenium—are disposed one on each side of a heater A comprising a bar of nickel, nickel alloy or other suitable metal, connected to a funnel B below which is a burner D, the flame of which is indicated by E. A copper conductor F clamps the elements C and S on to the heater A. The conductors F serve to draw off the current via terminals G and also to cool the other sides of the elements C and S, for which purpose they are each provided with one or more fins $f$. The copper clamps F are simple copper rods pressed with their ends against the thermo-electric generator elements C and S by means of the springs H and thereby clamping these elements to the heater bar A. The thermo-electric generator elements are heated on their sides facing the heater bars A and they are cooled on their opposite sides facing the rods F. When a nickel bar A is heated, an electric current is generated in the thermo-couple constituted by the two thermo-electric generator elements C and S disposed on opposite sides of the heated bar A. The heat applied to the two thermo-electric elements causes negative ions to flow in the direction from element C consisting of an alloy in which copper predominates through the heated member and through element S consisting of an alloy in which silver predominates. Due to the departure of negative ions the copper-silver alloy element is thus positively charged relative to the external circuit and is, therefore, called the positive element, while the silver-copper alloy element S, from which the positive ions depart in the opposite direction, is negatively charged and, therefore, called the negative element.

The points of contact of the parts A and F with alloys S and C should be clean and free from danger of oxidation as far as possible. In order to prevent the selenium from leaving the alloys S and C and entering the metal of the parts A and F, the contact points are plated with rhodium, platinum, iridium or palladium.

Instead of the flame burner D, any other suitable heating means may be employed. The working temperature at the cold side or end is desirably about 100° C., whilst the hot side or end is about 300° C. to 400° C. The potential will be greater at about 400° C. at the hot end and about 300° C. at the cold side or end than at 300° C. at the hot end and 200° C. at the cold end, but at the higher temperatures more heat would be wasted directly from the heater. An upper limit for the hot end would be about 400° C. to 500° C.

In the form illustrated in Figures 1 and 2, four generators are combined and the conductors F thereof are connected in series by leads I, I¹, I², whilst in Figures 3 and 4 four generators are combined in pairs in series and the conductors of each pair connected in series by the lead I³. In the form shown in Figure 5, three generators are combined in series. Here the heaters A are connected to metallic heat conductors J extending through the wall K of a furnace or boiler—on the inside of which they may be connected, for example in pairs, to heat collector plates L. Naturally, the parts A, J, L will be insulated from the medium K if the latter is not itself non-conductive in order to avoid current losses.

The distance between the parts, points or surfaces which are heated and cooled should be sufficiently short to ensure low electric resistance but sufficiently long to ensure sufficient resistance to heat. In other words, where the element is in the form of a sheet, the thickness of the sheet should be such that the temperature gradient through the sheet should be steep relatively to the resistance gradient through the sheet which is relatively flat. Similarly, where the element is used in the form of a rod, heated at one end and cooled at the other, its length must be such as to have similarly related temperature and resistance gradients. In practice, it is found that the limits lie between about 1/64 and about 1/8 of an inch, depending upon the material.

With an arrangement in accordance with the present invention, such as that illustrated in the accompanying drawings, it is found possible to charge a two-volt accumulator of the kind used in radio receiving sets which has not, as far as we are aware, ever been practicable with any arrangement hitherto proposed. An essential principle of the present invention would appear to be a selection of dimensions for the element such that temperature and resistance gradients bear the aforesaid relationship.

I claim:

1. A device for converting heat energy into electrical energy, comprising a positive thermo-electric generator element of a metal selected from the group consisting of copper and the copper-silver alloys in which copper predominates and being saturated with selenium, a negative thermo-electric generator element of a metal selected from the group consisting of silver and the silver copper alloys in which the silver predominates and being saturated with selenium, each of said thermo-electric elements having a thickness not exceeding 1/8 of an inch, means including a metal conductor for heating one side of each of said elements, means including conductor pieces for cooling the other sides of said elements, and means for taking off the generated current.

2. A device, as claimed in claim 1, comprising fins provided on said conductor pieces to assist in cooling said other sides of said elements.

3. A device for converting heat energy into electrical energy, comprising a heating means having two metal surfaces electrically connected with one another, a positive thermo-electric generator element of a metal selected from the group consisting of copper and the copper-silver alloys in which copper predominates and being saturated with selenium, a negative thermo-electric generator element of a metal selected from the group consisting of silver and the silver-copper alloys in which silver predominates and being saturated with selenium, each of said elements having a thickness not exceeding 1/8 of an inch and being disposed with one of its sides in contact with one of said metal surfaces, respectively, means including conductor pieces for cooling the other sides of said elements, means for taking off the generated current, and a plating of a metal selected from the group consisting of rhodium, platinum, iridium and palladium, said plating being disposed between the points of contact of said elements and said metal surfaces.

4. A device for converting heat energy into electrical energy, comprising a number of positive thermo-electric generator elements of a metal selected from the group consisting of copper and the copper-silver alloys in which copper predominates and being saturated with selenium, an equal number of negative elements of a metal selected from the group consisting of silver and the silver-copper alloys in which silver predominates and being saturated with selenium, each of said elements having a thickness not exceeding 1/8 of an inch and each positive element being associated with a negative element to form a thermo-couple, means including at least one metal conductor for each thermocouple for heating one side of each of said elements, means including conductive pieces for cooling said elements on their other sides, means for electrically connecting all said elements in series, and means for taking off the generated current.

5. A device for converting heat energy into electrical energy, comprising a heating means having two metal surfaces electrically connected with one another, a positive thermo-electric generator element of a metal selected from the group consisting of copper and the copper-silver alloys in which copper predominates and being saturated with selenium, resilient means to press said positive element against one of said metal surfaces, a negative thermo-electric generator element of a metal selected from the group consisting of silver and the silver-copper alloys in which the silver predominates and being saturated with selenium, resilient means to press said negative element against the second of said metal surfaces, and conductors of low resistance for taking off the generated current.

6. A device, as claimed in claim 5, comprising heat conductive members interposed between said thermo-electric element and said resilient means to remove heat from the surfaces of said thermo-electric elements remote from said metal surfaces.

HENRY REGINALD MILNES.